Figure 1:
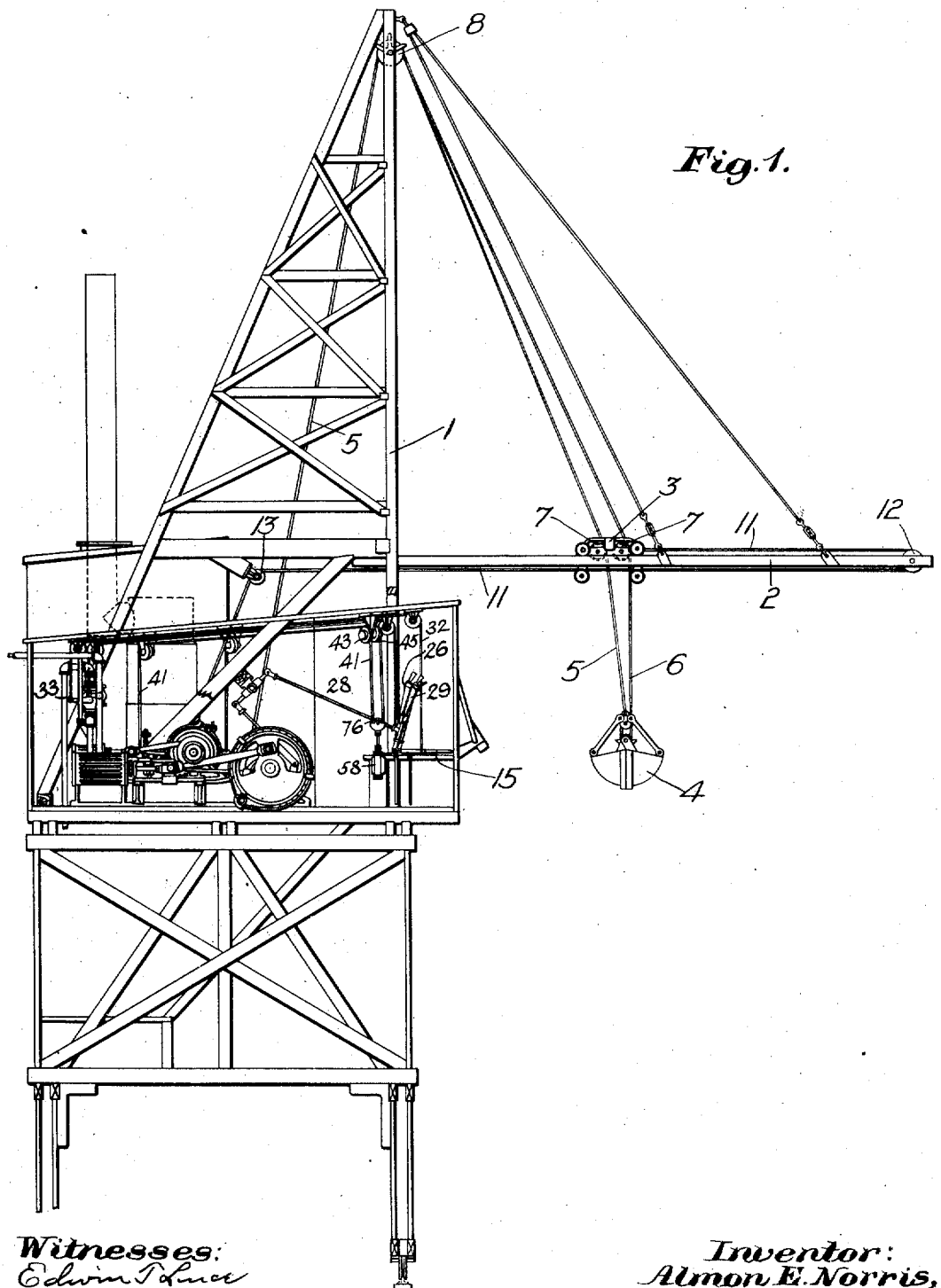

A. E. NORRIS.
HOISTING APPARATUS.
APPLICATION FILED NOV. 27, 1907.

1,071,010.

Patented Aug. 19, 1913.
6 SHEETS—SHEET 1.

Witnesses:
Edwin T. Luce
Horace A. Crossman

Inventor:
Almon E. Norris,
by Emery Booth
Attys.

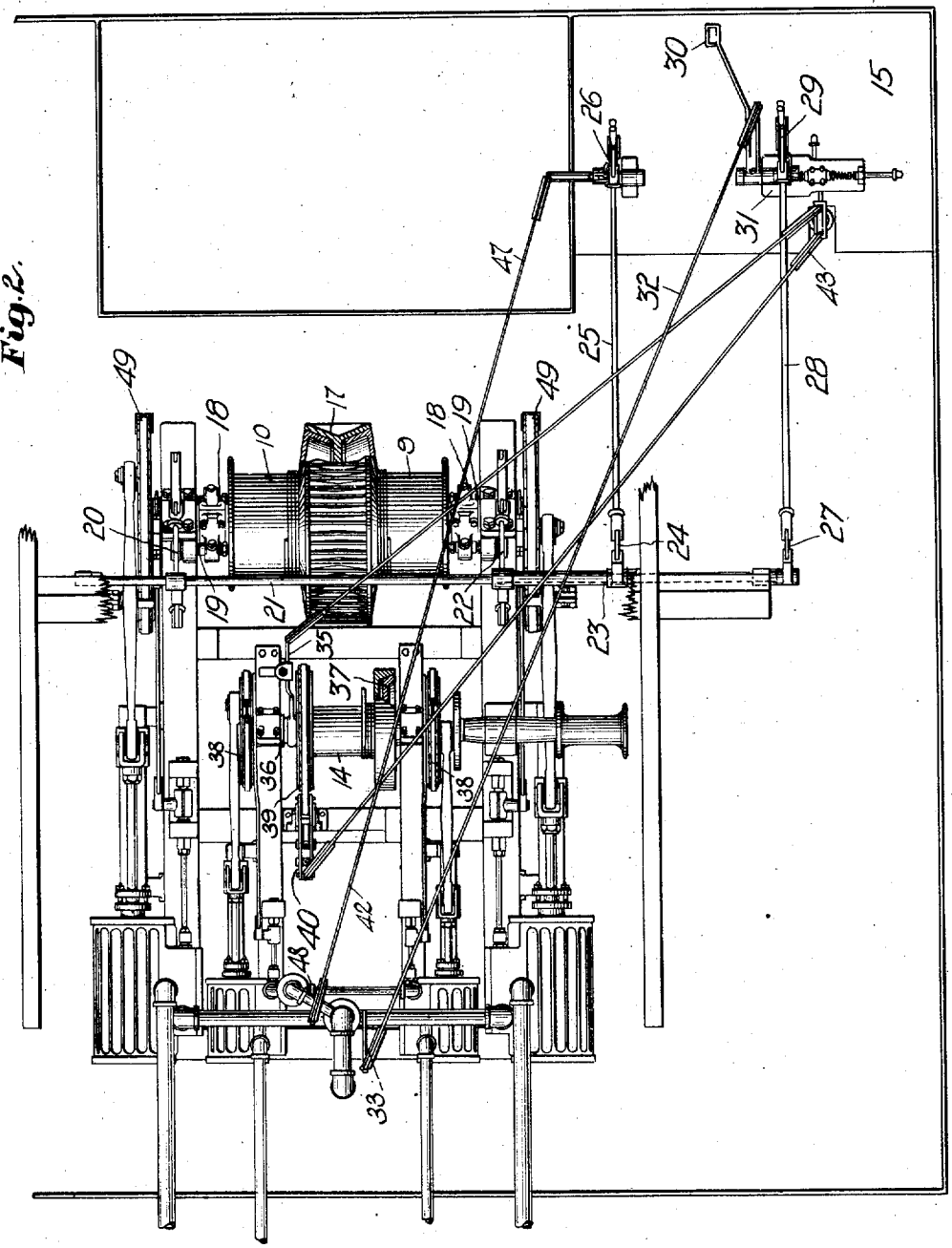

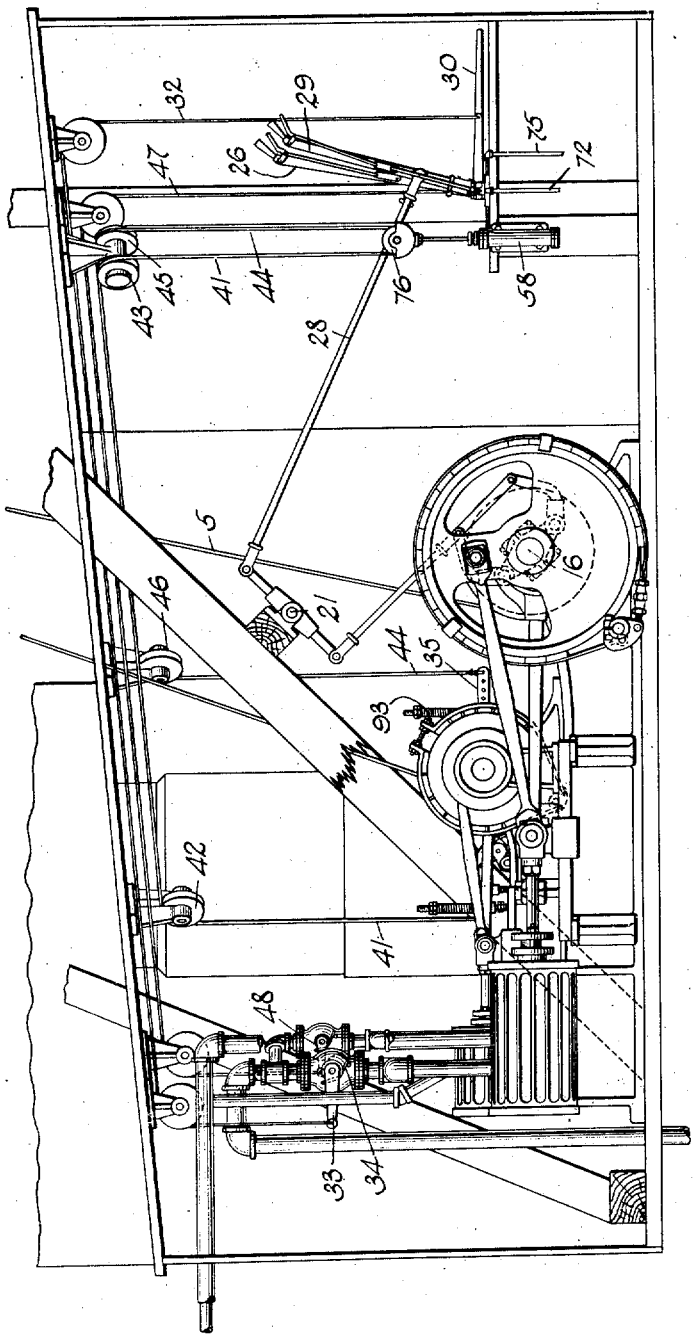

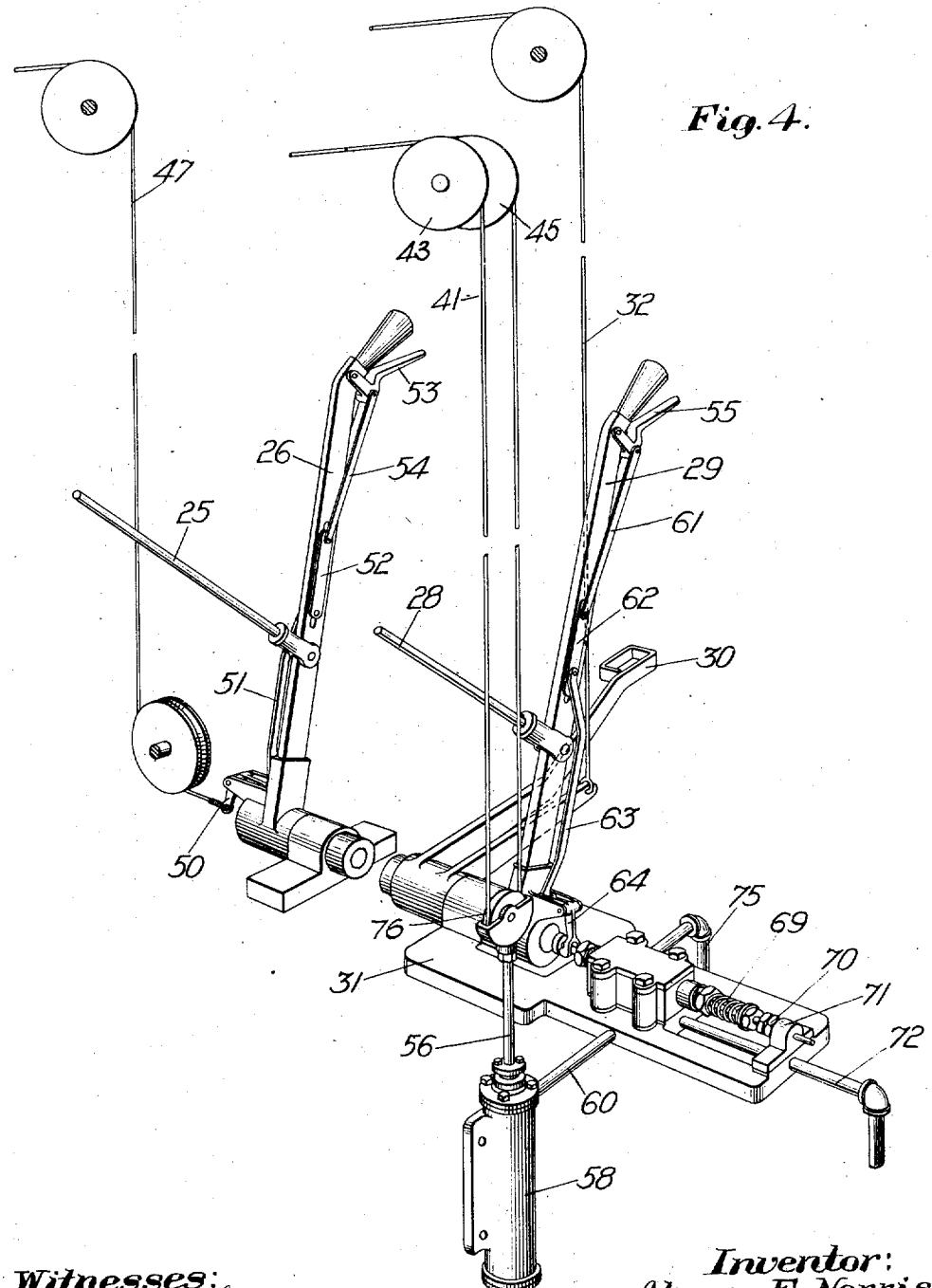

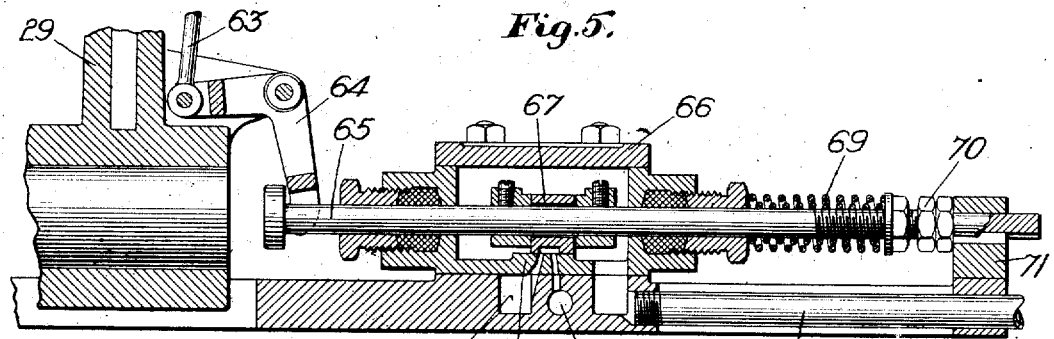
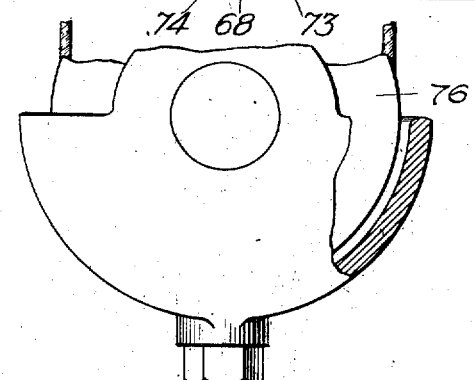
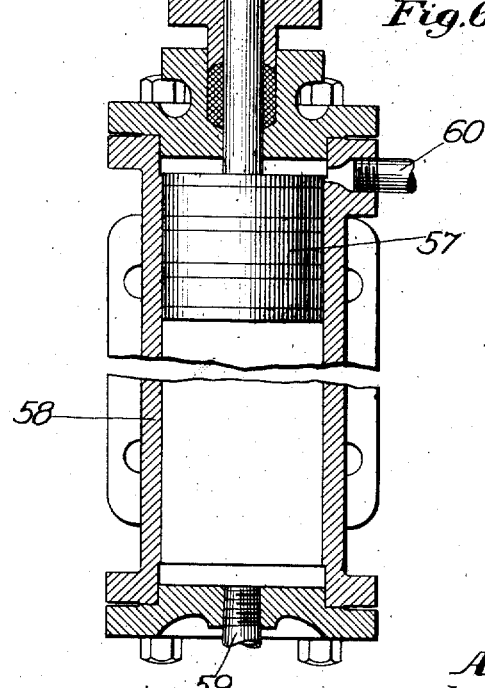

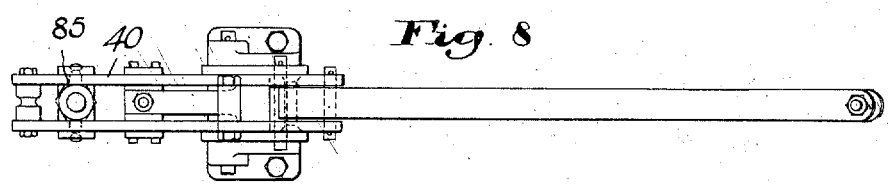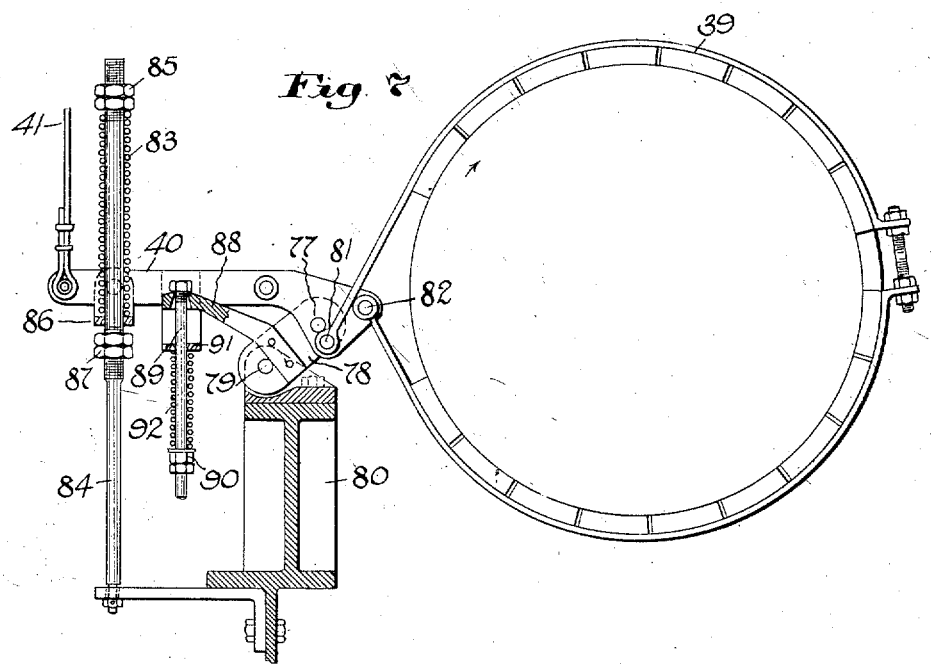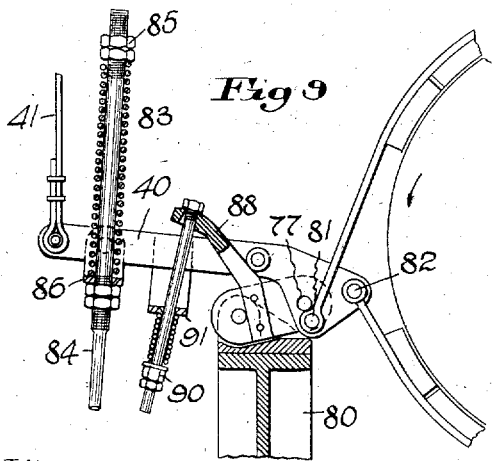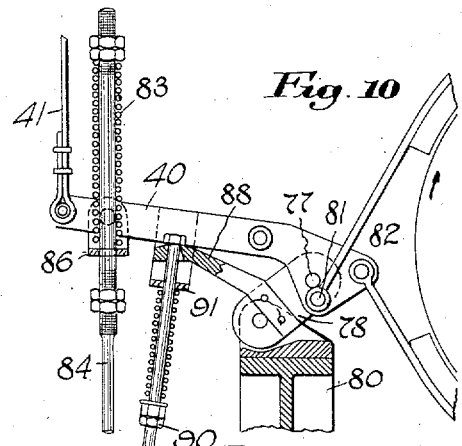

UNITED STATES PATENT OFFICE.

ALMON E. NORRIS, OF CAMBRIDGE, MASSACHUSETTS.

HOISTING APPARATUS.

1,071,010.  Specification of Letters Patent.  Patented Aug. 19, 1913.

Application filed November 27, 1907. Serial No. 404,068.

*To all whom it may concern:*

Be it known that I, ALMON E. NORRIS, a citizen of the United States, residing at Cambridge, in the county of Middlesex and State of Massachusetts, have invented an Improvement in Hoisting Apparatus, of which the following description, in connection with the accompanying drawings, is a specification, like letters on the drawings representing like parts.

My invention relates to hoisting apparatus and consists more particularly in improvements which add to the efficiency and economical operation, as well as facilitating the control of such apparatus.

My invention will be best understood by reference to the following description when taken in connection with the accompanying illustration of one specific embodiment thereof, while its scope will be more particularly pointed out in the appended claims.

In the drawings:—Figure 1 shows in side elevation a hoisting tower embodying one form of my invention; Fig. 2 is a sectional plan, on an enlarged scale, showing the principal controlling and motive parts for controlling the movements of the trolley and bucket; Fig. 3 is a side elevation of the part shown in Fig. 2; Fig. 4 shows in perspective and on an enlarged scale the construction and the connections of the controlling levers; Fig. 5 is a longitudinal sectional elevation of the valve which governs the pressure-actuated controller for the trolley drum; Fig. 6 is a sectional elevation showing the pressure controller for the trolley drum; Fig. 7 is a sectional elevation of the band brake and controlling levers for the trolley drum; Fig. 8 is a plan view of the same; and Figs. 9 and 10 show different positions for the brake controlling levers.

Referring to the drawings, I have there shown my invention as applied to a hoisting tower 1, carrying the laterally extending boom 2, which latter provides a track-way for the trolley carriage 3, by which the hoisting element, herein represented as the grab or bucket 4, is carried. While I have shown my invention as embodied in an apparatus of this type, that is, a tower hoist, and employing the instrumentalities which are herein specifically described, and while this will sufficiently set forth the broad principles of the invention for the understanding of those skilled in the art, it is to be understood that the application of this invention is not limited to this particular type of hoisting apparatus, or to a hoisting apparatus employing the elements which are here alone set forth, but that numerous other applications and embodiments of the herein described invention may be had.

Referring to the specific details of the illustrated apparatus, the bucket 4, which may be of any suitable or usual construction, such for example, as that set forth in U. S. Patent No. 699,000, dated April 29, 1902, is provided with operating ropes by which the raising and lowering of the bucket and the opening and closing of the bucket jaws may be controlled. In the present instance the operating ropes are two in number, and comprise the hoisting rope 5, by which the bucket is suspended and raised or lowered, and the opening and closing rope 6, by which the jaws are opened or closed. These ropes both pass upward over and about suitable sheaves 7 upon the trolley, thence obliquely upward over the guide sheaves 8 near the top of the tower 1, and thence downward to the operating room near the base of the tower, where they pass over and about and are secured to suitable rope-winding drums 9 and 10 (Fig. 2), the former, or the hoisting drum, serving to control the hoisting rope 5, and the latter, or the opening and closing drum, serving to control the opening and closing rope 6.

The trolley with its attached bucket is traversed outwardly along the boom by means of the trolley rope 11 fixed to the outer end of the trolley carriage, whence it passes to the end of the boom over the guide sheaves 12, thence back to the tower over and about the guide sheave 13, and thence to the trolley drum 14 (Fig. 2) upon which it is wound or unwound at the will of the operator. The trolley drum is driven by any suitable form of motor, but preferably by means of a steam engine or other prime mover which is adapted to convert into the required motion any suitable form of energy, such as pressure fluid, received from a constantly available source of supply. When the bucket is hoisted the inward pull of the oblique hoisting rope 5 tends to traverse the trolley inwardly along the boom toward the tower, so that the trolley may be traversed at will in either direction by merely winding in the trolley rope on the trolley drum, or releasing the trolley drum to permit the rope to unwind.

One important feature of my invention is the arrangement of controlling devices in such simple and efficient manner that the entire control of the bucket through the three rope-winding drums described, may be handled by a single operator stationed upon the platform 15 in the operating room.

Any suitable devices for driving the rope-winding drums may be employed, but referring to the details of the driving connections for the drums, which are here shown for the purpose of illustrating my invention, the hoisting drum 9 and opening and closing drum 10 are loosely journaled side by side upon the main driving shaft 16, but may be clutched thereto, either separately or together by being forced into engagement with the centrally located clutch member 17 (see broken away portion, Fig. 2). The drum shaft is connected at opposite ends through a crank and connecting-rod connection, to a two-cylinder horizontal engine, for which, however, may be substituted any suitable motor.

Any suitable clutch-operating devices may be employed for the drums 9 and 10 and I have here indicated sliding collars 18 and clutch-operating screws 19 of the type described in my prior Reissue Patent No. 12,085, for forcing the drums either separately or together into clutching engagement with the shaft. For this purpose the clutch screws for the drum 10 are connected through suitable connections to the operating rod 20 which is connected to be advanced or retracted by the overhead operating shaft 21. The clutch-operating screws for the drum 9 are connected to the rod 22, which latter is connected to be moved as the sleeve 23 is turned, which sleeve is journaled for independent movement upon the shaft 21. The clutch-operating sleeve 23 carries the arm 24 attached to the link connection 25, the latter extending to the operating platform 15, where it is attached to the hand lever 26. The clutch-operating shaft similarly has connection through the upright arm 27 and a connecting link 28 with the hand lever 29 also at the operating platform. The hand levers 26 and 29 are pivotally mounted side by side (see Fig. 4), so that through their manipulation the operator can readily control the clutching or unclutching of the rope-winding drums. By the side of the hand lever 29 is a substantially horizontal foot lever 30 (see also Fig. 4) fulcrumed upon the supporting bracket 31 with the hand lever 29. The foot lever which is arranged to be conveniently operated by the tower operator is connected to a flexible member, such as the rope 32, which, passing up and over suitable sheaves, leads across the tower and thence down to the arm 33 of the throttle valve for the main hoisting engine. To the throttle valve arm is also connected the spring 34 tending normally to close said throttle. The latter, however, may be readily opened to a greater or less extent through the upward pull of the throttle rope 32 caused by downward pressure upon the foot treadle 30. It will therefore be seen that the operator can entirely control the movements of the hoisting and opening and closing ropes from the two hand levers 26 and 29, and, through the foot lever 30, can also control the starting and stopping of the engine which drives the hoisting and opening and closing drums 9 and 10. In the present embodiment of my invention I have also associated with the operating platform other controlling devices by which the movements of the trolley can be regulated so that the entire control of all the movements of the bucket may be exercised by a single operator without altering his position upon the operating platform. Although other means for winding in or letting out the trolley rope 11 may be employed, I have here provided for that purpose a prime mover in the form of an additional but smaller double-cylinder horizontal trolley engine, connected by means of a crank and connecting rod to drive the trolley drum 14. The latter is loosely journaled upon its driving shaft, but may be clutched to or unclutched from the same by means of the lever 35 which is adapted to turn the nut 36 and force the drum into engagement with the clutch member 37 at the opposite end of the drum. The clutch member 37 is keyed to the driving shaft, to which latter are also secured at opposite ends of the drum crank disks which are encircled by the automatic brakes 38. The latter permit driving movement of the engine in a direction to wind the rope on the trolley drum but prevent engine movement in the opposite direction. Any suitable brake construction may be employed for the purpose, such as that shown in my prior patent Reissue No. 12,040.

In addition to the automatic brake or brakes 38 the trolley rope-winding drum 14 is also provided with a brake 39 encircled and engaging a suitably formed surface directly on the drum itself. This brake, which will be more fully referred to, is of such a construction that it normally leaves the drum free to turn in the direction of winding on, but opposes the unwinding movement of the drum, there being provided, however, a brake-releasing-lever 40 which may be elevated to release the brake so that the drum may also be turned to unwind the trolley rope. The end of the brake lever 40 is connected to the brake controlling-rope 41, passing upwardly over the sheaves 42 and 43 and thence down to suitable controlling devices at the operating platform (to be described), to which devices are also connected the clutch-controlling rope 44, the opposite end of which, after passing over sheaves 45 and 46, is attached to the clutch-operating lever 35 to apply or release the clutch. The starting and stopping of the trolley engine may also be controlled from the operating platform by controlling the energy supply for the engine, this being accomplished herein by means of a third controlling rope 47, which, passing over appropriate sheaves, is connected (see Figs. 2 and 3) to the throttle lever 48 of the trolley engine where it actuates a throttle placed in the engine supply pipe. Automatic brakes 49 are preferably provided upon the hoisting drum shaft for preventing the latter from turning, except in the direction when winding on, these being similar to the brakes provided at opposite ends of the trolley drum shaft.

Referring now more particularly to the controlling devices at the operating platform, the trolley engine throttle rope 47 is connected (Fig. 4) to one arm of a bell-crank lever 50, the opposite arm of which is pivoted to a link 51 connected to a sliding block 52 upon the hand-lever 26, the hand latch 53 being provided to lie closely adjacent to the handle of the lever 26 and have connection to the sliding block through the links 54, whereby the operator, without removing his hand from the lever 26, may also open and close or partially close the throttle for the trolley engine by pressing or releasing the hand latch 53. The connection of the throttle controlling rope 47 to the bell-crank lever 50 being substantially in line with the axis about which the hand lever 26 is moved, movement of the latter does not tend to draw down the trolley rope, or affect in any way the control of the throttle therethrough.

In order to control the application of the trolley drum brake 39 and the trolley drum clutch 37, and thereby the movements of the trolley rope, I have provided a hand latch 55 pivoted adjacent the handle of the hand lever 29, but in order that the control of such hand latch over the trolley drum may be exercised with nicety and effectiveness I have interposed between such latch and the brake band a pressure-actuated controller, by which power is directly applied jointly to the brake and clutch.

Referring to Figs. 4, 5 and 6, the brake controlling rope 41 and the clutch controlling rope 44 pass about a sheave 76 connected at the operating platform to the piston rod 56, the latter having attached thereto (Fig. 6) the piston 57 working within the pressure cylinder 58. It therefore follows that when the piston is drawn down it draws down on the two operating ropes and simultaneously releases the brake and disengages the friction clutch, the sheave 76 placing an equalizing pull on the two ropes. The lower part of the cylinder is connected to the atmosphere through the vent pipe 59, but the upper part has connection to a pipe 60, which may be placed in communication with a source of steam or other pressure, or with the atmosphere at will, by means of the hand latch 55 on the hand lever 29. The piston is normally held at the top of the cylinder by the tension of a spring at the brake, but when the hand latch 55 is moved to admit pressure through the pipe 60, the piston is forced down and the brake released.

To control the supply of pressure through the pipe 60 the hand latch has jointed connection through the link 61 with a sliding block 62, the latter attached through the link 63 to the pivoted bell-crank lever 64. The depending end of the latter (Fig. 5) is forked and embraces the headed end of the valve stem 65 arranged in line with the axis about which the hand lever 29 turns.

The valve stem passes through suitably packed openings through the valve chamber 66, within which it is attached to a D-slide valve 67, adapted to slide along the valve seat 68. At the opposite side of the valve chamber the valve stem is encircled by a spiral spring 69 adapted to press against a washer and nut upon the stem, so that the latter is normally held in the position shown with the nuts 70 abutting against the stop piece 71. Steam or other pressure is admitted to the valve chamber through the admission pipe 72. The port 73 is connected to the cylinder through the pipe 60 and the port 74 is connected to the exhaust pipe 75 (see Fig. 4).

In the position shown, and so long as the hand latch 55 is not gripped by the hand of the operator, the valve 67 maintains communication between the ports 73 and 74, and therefore between the cylinder 58 and the exhaust. When the hand latch is pressed by the hand of the operator the valve 67 is moved to the left, as viewed in Fig. 5, against the pressure of the spring 69, opening the port 73, and, therefore, the cylinder 58 to the live pressure in the valve chamber. This immediately releases the brake at the trolley drum and renders the latter effective for letting out the rope, the speed of the traverse of the trolley being within the control of the attendant through variations of the hand pressure upon the latch 55.

The construction of the trolley drum brake 39 possesses points of novelty and advantage, particularly as applied to this class of hoisting devices, there being obtained by its employment a very complete and delicate control over the trolley drum.

Referring to Figs. 7–10 I have there shown the details and represented the action of the brake under varying conditions. Referring particularly to Figs. 7 and 8 the brake lever 40 comprises a pair of suitably shaped and spaced plates pivotally mounted at 77 upon the link 78, the latter being also pivotally secured for swinging movement at 79 upon the fixed support 80. The upper and lower halves of the brake band are secured at their ends to the brake lever 40, respectively at the points 81 and 82, these points being so selected both with reference to the pivotal attachment 77 of the lever to the link 78 and a center line passing from the pivotal center 79 of the link to the axis of the trolley drum, that the band tends to open or release the drum on tipping movement of the lever about its pivotal attachment 77 (Fig. 10) or on the downward tipping movement of the link 78 (Fig. 9). The pull of the trolley rope normally tends to turn the drum in the direction of the arrow shown in Fig. 7. This places a frictional pull upon the band, the resultant of which will lie approximately (according to the adjustment) in the direction of the link 78, as represented in Fig. 7, tending to draw the link to the position there shown. This position of the lever and link draws the band about the drum preventing movement of the latter in the direction of the arrow, and, therefore, preventing unwinding of the rope. The pull of the drum is resisted by the spring 83, which latter encircles the upright rod 84 between the adjustable nuts 85 and the stirrup 86, which latter is secured to the lever 40. This spring tends to press the outer end of the lever down toward the adjustable abutting nuts 87 and maintains the necessary tension on the band. The spring 83 is adjustable by means of nuts 85 so that varying resistance may be offered to the pull of the band, thereby regulating the load under which the brake will slip. The rod 84 is loosely secured to an underlying fixed support, so that it may rock back or forth to adapt itself to movements of the lever 40.

The link 78 has rigidly secured thereto a rearwardly extending arm 88 from which depends a bolt 89, the latter carrying at its lower end adjustable nuts 90, between which and a stirrup 91, which latter is secured to the lever arm 40, is a relatively weak spring 92, but of sufficient strength to spread apart the outer ends of the lever 40 and the arm 88, thereby to sustain the link 78 and the attached ends of the band.

As stated, the brake normally assumes the position shown in Fig. 7, preventing the unwinding of the rope. When the drum is turned in the opposite direction, however, by the trolley engine, the friction on the lower half of the band immediately pulls the link down sufficiently toward the extreme position represented in Fig. 9 to release the band and permit the free rotation of the drum. When it is desired to release the band for the unwinding of the rope, the brake operating rope 41 is pulled upwardly, as heretofore described, raising the outer end of the brake lever 40 against the spring 83, as represented in Fig. 10, and swinging the points of attachment to the brake band, as also shown in Fig. 10, so that the band is loosened and the drum permitted to turn to unwind the rope. This construction of brake differs from automatic brakes, with which I have heretofore been familiar, in that the drum is quickly and effectively freed for rotation in the direction represented in Fig. 9, while, at the same time, delicately controlled for rotation in the opposite direction, being capable of releasing either gradually or completely, so that the speed in unwinding may be sensitively controlled. The clutch lever 35 (Fig. 3) is adapted to work against a spring 93, which spring, therefore, normally maintains the drum clutched to the driving shaft.

From this description of the operating levers it will readily be seen that the operator has within the control of his right hand the clutching and unclutching of the grab opening and closing rope, and, at the same time, through the hand latch 55, the control of the inward movement of the trolley. Subject to the control of his left hand is the clutching and unclutching of the hoisting rope drum and the throttle control of the trolley engine, the throttle control of the hoisting engine being within his supervision through the medium of the foot lever 30. This places within the control of a single operator those functions which have heretofore customarily required the presence of two different attendants. During the operation of the tower, the trolley is normally held in the position where it is left by the brake 39 which prevents the unwinding of the rope, the load upon the rope being partly taken by the automatic brakes 38. When the operator desires to run the trolley out it is necessary merely to press the left-hand latch 53, thereby starting the trolley engine which winds in the trolley rope, the winding-in movement of the drum being unhindered either by the brake 39 or the automatic brake 38. When it is desired to run the trolley in it is necessary only to press the right-hand latch 55, thereby releasing the brake 39 more or less according to the speed of trolley movement desired, and, at the same time, unclutching the trolley drum from the driving shaft.

Various combinations of the automatic brake 38, the friction clutch and the brake 39 may be employed to accomplish the same general results as described. In the above described form of the invention the automatic brake 38 might be omitted entirely, if desired, leaving the brake 39 to take the entire load. On the other hand, the brake 39 might be omitted, leaving the automatic brake alone to prevent the unwinding movement of the drum. Or again, with the automatic brake omitted, the clutch between the drum and the driving shaft might be omitted, or allowed to remain permanently in engagement, the engine being permitted to run backward when the drum is released by the brake. In the latter case, and preferably in all cases, the engine is provided with some form of throttle relief valve, which, when cutting off admission to the trolley engine cylinders also releases the pressure trapped in the cylinders, thereby not only permitting the engine to run backward but preventing it from running forward after the throttle has been closed. These and other modifications, all within the spirit of my invention will be readily understood by those skilled in the art.

While I have shown and described one form of my invention, it is to be understood that the same is not limited to the details of parts herein shown, or to the specific application of the invention described, but that extensive modifications therein may be made without departing from the spirit of the invention.

Claims:

1. In a grab hoist, the combination with a trolley drum, a driving shaft therefor, a clutch between the driving shaft and the drum, a brake for the drum, and a pressure-controlled device for simultaneously controlling the brake and the clutch.

2. In a hoisting apparatus the combination with a hoisting device such as a grab or the like, controlling means therefor, a trolley, a trolley rope, a rope-winding drum therefor, driving means for the drum, a clutch between the said driving means and the drum, means for operating said clutch, and a brake between the said driving means and the clutch acting, while the latter is engaged, to prevent the unwinding movement of the drum while permitting the winding-in movement thereof.

3. In a hoisting apparatus the combination with a hoisting device such as a grab or the like, controlling means therefor, a trolley, a trolley rope, a rope-winding drum therefor, driving means for said drum, a clutch between the driving means and the drum, a brake engaging said drum and normally preventing unwinding movement of the drum while permitting winding movement thereof, a second brake between the driving means and the clutch and means for releasing the first-named brake and the clutch.

4. In a hoisting apparatus the combination with a hoisting device such as a grab or the like, a plurality of controlling levers therefor, a trolley, a trolley rope, a rope-winding drum, a driving motor for said winding drum, means normally for holding said drum against unwinding movement and auxiliary controlling means for said driving motor and said holding means mounted upon said controlling levers.

5. In a hoisting apparatus, the combination with hoisting elements comprising a grab and a traversing support, a traversing rope and rope winding drum, a prime mover for turning said drum, a source of energy supply for said prime mover, means normally holding said drum against unwinding movement, a pair of main controlling levers for one of said hoisting elements and auxiliary controlling means for said other hoisting element accessible to the operator at the said main controlling levers.

6. In a hoisting apparatus the combination with a hoisting device, controlling means therefor, a trolley, a trolley rope and rope-winding drum, a driving engine for said drum, an engine throttle, and a throttle controlling device mounted upon one of said controlling means.

7. In a hoisting apparatus the combination with a grab, means for controlling the grab, a trolley and means for controlling the trolley including a trolley rope and rope-winding drum therefor, a brake permitting free movement of said drum in one direction only while holding said drum against movement in the opposite direction, means for releasing said brake to permit movement in said opposite direction, and means for adjusting the holding power in said brake.

8. In a hoisting apparatus the combination with a tower, a boom extending therefrom, a trolley adapted to travel along said boom, a grab supported by said trolley, controlling means for said grab, a trolley rope and rope-winding drum therefor, a brake for said drum comprising a brake band, a pivoted member to which the opposite ends of said band are secured, and a movable member to which said pivoted member is attached, said movable member being adapted to automatically shift its position in response to the movement of the drum.

9. In a hoisting apparatus, the combination with a trolley, of a grab carried thereby, an operating rope therefor, a hand-controlling lever, a valve and its valve stem alined with the axis of said lever, a pressure-controlled device connected to be controlled by said valve, a hand grip for said lever, and connections between said hand grip and said valve stem for moving the same, irrespective of the position of said hand lever.

10. A hoisting apparatus having a grab or bucket, a trolley, a trolley rope-winding drum and clutch therefor, and a hand-operated controlling device combined with auxiliary controlling means, including a distinct independent elastically mounted manually operable element, the latter adapted to be operated in one direction of its working movement by the hand of the operator while still retaining control of the said device, said device and auxiliary controlling means acting to exercise control, one over the clutch and the other over the bucket.

11. In a hoisting apparatus, the combination with a bucket of a traversing support therefor, a controlling lever for controlling the movement of the bucket on its traversing support, traversing means, a hand grip upon said lever, a slide rod axially alined with said lever, means connecting said slide rod with said hand grip and controlling means for said traversing means connected with said slide rod and controlled through movement of said hand grip.

12. In a hoisting apparatus, the combination of a bucket, a main drum for hoisting and lowering the same, a friction device for controlling said drum when lowering the bucket, a hand lever mechanically connected with said friction device for directly controlling the same, a trolley for carrying said bucket horizontally, a motor for controlling the rearward motion of said trolley, a valve for controlling the operation of said motor, and operating connections for said valve having their control located on the said hand lever.

13. In a hoisting apparatus the combination with a hoisting device such as a grab or the like, controlling means therefor, a trolley, a trolley rope, a rope-winding drum therefor, a brake normally preventing the unwinding movement of the drum while permitting winding-in movement thereof, and means to release said brake to permit the unwinding movement of the drum.

14. The combination with a hoisting tower, of a trackway support extending laterally therefrom, a traversing carriage adapted to move along said trackway, a hoisting device carried by said carriage, a controlling rope for controlling said hoisting device, said carriage being adapted to be drawn inwardly through the pull of said controlling rope, a carriage traversing drum provided with rope connections leading to said carriage, said carriage adapted to be drawn outwardly along said trackway by the winding-in movement of said drum, a prime mover for driving said drum, a source of energy supply for said prime mover, a brake for automatically holding said drum against unwinding movement, and means for releasing said brake to allow said drum to turn reversely for the inward movement of said traversing carriage.

15. The combination with a hoisting tower, of a trackway support extending laterally therefrom, a traversing carriage adapted to move along said trackway, a hoisting device carried by said carriage, a controlling rope for controlling said hoisting device, said carriage being adapted to be drawn inwardly through the pull of said controlling rope, a carriage traversing drum provided with rope connections leading to said carriage, said carriage adapted to be drawn outwardly along said trackway by the winding-in movement of said drum, a prime mover for driving said drum, a source of energy supply for said prime mover, a brake for automatically holding said drum against unwinding movement, and means for releasing said brake to allow said drum to turn reversely for the inward movement of said traversing carriage.

16. In a hoisting apparatus, the combination with a bucket of a trolley, a trolley rope and rope winding drum, a motor for driving the same, means for automatically preventing unwinding movement of said drum while permitting motor actuated winding-on movement of the drum, and controlling means for permitting the drum to turn freely in a direction for the unwinding movement.

17. In a hoisting apparatus, the combination with a bucket, a trolley, a rope winding drum for the bucket, a controlling lever for said drum, a trolley rope, a trolley rope winding drum, a brake automatically preventing the unwinding movement of the drum but permitting winding-on movement thereof, and means within the grasp of the operator while retaining his control over the bucket controlling lever for releasing the brake to permit the unwinding movement of the trolley rope drum.

18. In an apparatus of the class described, the combination with a bucket, a traversing rope and rope drum, a pair of bucket operating levers and controlling elements for the traversing drum including a device mounted upon each of the bucket operating levers, said device and said lever in each case being provided with distinct relatively movable grasping portions each having a working movement independent of the working movement of the other.

19. The combination with a bucket or the like of a traversing rope, a traversing drum, a pair of bucket operating levers having grasping portions and controlling elements for the drum including a pivoted hand grip on each lever adjacent the grasping portion of the latter and movable relatively thereto.

20. The combination with a bucket or the like of a traversing rope, a traversing drum, a pair of bucket operating levers and controlling elements for the drum including an elastic grasping device on each lever.

21. The combination with a bucket or the like of a traversing rope, a traversing drum, a pair of bucket operating levers and controlling elements for the drum including an elastically yieldable device on each lever, the device and lever in both cases having each a working movement independent of the working movement of the other.

22. In a hoisting apparatus, the combination with a bucket or the like of a traversing rope, a traversing drum, a pair of bucket ropes, bucket frictions and mechanically connected friction operating levers and controlling elements for the drum including a manually actuated element connected to each lever and adapted to be actuated by the operator while maintaining his hold on the friction levers.

23. In a hoisting apparatus, the combination with a bucket or the like, a traversing rope, a traversing drum, a pair of bucket ropes, bucket frictions, a pair of bucket controlling levers directly and mechanically connected to control each a friction device and a pair of auxiliary controlling elements for the traversing drum adapted to be actuated by the operator while maintaining his control over the bucket controlling levers.

24. In a hoisting apparatus, the combination with a bucket, a traversing support, a hoisting rope, an opening and closing rope, a rope winding drum for each rope, a friction device for each drum, a pair of bucket controlling hand levers to control each a friction device, controlling elements for the traverse of the bucket including an auxiliary controlling device movably mounted upon each one of the bucket levers and within the grasp of the hand holding the bucket lever, said auxiliary device and bucket lever having each a working movement independent of the working movement of the other.

25. In a hoisting apparatus, the combination with a bucket, a traversing support, a pair of bucket levers, a traversing rope, a rope winding drum and motor, a brake for the drum, a starting device for the motor and controlling elements for said brake and starting device including an auxiliary controlling device movably mounted upon each of the bucket controlling levers.

26. In a hoisting apparatus, the combination with a bucket, a traversing support, a pair of bucket levers, a traversing rope, a rope winding drum and motor, a brake for the drum, a starting device for the motor, a pressure-actuated member for controlling the brake, a valve for said pressure actuated member, a pivoted hand grip upon one of said levers for controlling said valve and a pivoted hand grip upon the other of said levers for controlling the motor starting device.

27. In a hoisting apparatus, the combination with a bucket or the like of a traversing rope, a traversing drum, bucket ropes, a pair of winding drums for the said bucket ropes, a friction device for each drum, a pair of bucket controlling levers directly and mechanically connected to control each a friction device, a pressure fluid engine for driving the traversing drum, a starting device for said engine, a brake for said drum, controlling elements for the traversing drum adapted to be actuated by the operator while controlling said bucket friction levers and including an auxiliary control element for the said brake and a second control element for the said starting device.

28. In a hoisting apparatus, the combination with a bucket or the like, a hoisting rope, an opening and closing rope, a rope winding drum for each rope, a friction device for each drum, a pair of bucket controlling levers directly and mechanically connected to control each a friction device, a traversing support for the bucket, a traversing rope and rope winding drum, a pressure fluid engine to turn said drum, a brake normally set to hold said drum, a throttle for the engine, a grasping device upon one of said friction levers adapted to release said brake, and a grasping device upon the remaining friction lever to control said throttle.

29. In a hoisting apparatus, the combination with a hoisting device, a controlling means therefor, a traversing rope and rope winding drum, a prime mover for turning said drum, a source of energy supply for said prime mover, a starting device for controlling the energy supply for said prime mover and a control element for said starting device mounted upon one of said controlling means.

30. In a hoisting apparatus, the combination with a bucket or the like, of a bucket operating lever, a traversing rope, a rope winding drum and prime mover for turning the same, a source of energy supply for said prime mover, a starting device for controlling the energy supply for the prime mover and a manually actuated controlling element for the starting device adapted to be actuated by the operator while holding said lever.

31. In a hoisting apparatus, the combination with a bucket or the like, of a bucket operating lever, a traversing rope, a rope winding drum, a prime mover for turning the drum, a source of energy supply for said prime mover, a starting device for controlling the energy supply for the prime mover, and a controlling element for the starting device mounted upon said lever, said lever and controlling element having each a working movement independent of the working movement of the other.

32. In a hoisting apparatus, the combination with a bucket or the like, of a bucket operating lever, a traversing rope, a rope winding drum, pressure fluid motor for turning the same, a starting device for the motor, and a grasping device on said lever for controlling said starting device.

33. In a hoisting apparatus, the combination with a bucket or the like, a bucket operating rope, a rope winding drum, a friction device, a bucket controlling lever connected to control said friction device, a traversing rope, rope drum and motor, a source of energy supply for the motor, a motor starting device, and a grasping device mounted on said friction lever for controlling said starting device.

34. In a hoisting apparatus, the combination with a bucket, a pair of bucket controlling levers, a traversing rope, a traversing rope motor, a source of energy supply therefor, a starting device for controlling the energy supply for said motor and means for controlling said starting device including a manually actuated element adapted to be moved by the operator while holding one of said levers.

35. In a hoisting apparatus, the combination with a bucket, a traversing rope, a traversing drum, a pressure-fluid engine, a pair of bucket operating levers, an engine throttle, and a grasping device upon one of said levers for controlling said throttle.

36. In a hoisting apparatus, the combination with a bucket, a traversing rope, a traversing drum, a pressure-fluid engine, a pair of bucket operating levers, an engine throttle and controlling elements for said drum including a control element for the throttle upon one of said bucket levers and a second control element on the other of said levers.

37. In a bucket hoist, the combination with a pair of bucket levers of a traversing rope, a pressure-fluid traversing engine, a throttle, a brake and controlling means for the traversing rope including a throttle control element on one of said levers and a brake control element on the other of said levers.

38. In a hoisting apparatus, the combination with a bucket or the like, of a pair of bucket ropes, a rope winding drum for each rope, a friction device for each drum, a pair or bucket controlling levers directly connected to control each a friction device, a traversing rope and rope winding drum, a brake for said drum, a pressure fluid engine for driving the drum and means comprising a pivoted hand grip on one of said levers adapted to be actuated by the hand of the operator holding a friction lever for controlling the brake.

39. In a hoisting apparatus, the combination with a bucket, a traversing rope, a rope winding drum, a brake automatically preventing the unwinding movement of the drum, but permitting winding on movement thereof, a bucket controlling lever and means for releasing the brake to permit unwinding movement thereof, said means being adapted to be actuated by the operator while maintaining his hold upon said bucket operating lever.

40. In a hoisting apparatus, the combination with a bucket operating lever, a traversing rope, a rope winding drum, a traversing motor to impart a rope winding movement to the drum, a brake normally preventing the unwinding movement of the drum but normally also permitting winding-on movement thereof, and an auxiliary control device within the control of the operator controlling said bucket operating lever for releasing the brake to permit the unwinding movement of the drum.

41. In a hoisting apparatus, the combination with a bucket of a pair of bucket operating levers, a traversing rope and rope winding drum, a pressure-fluid engine for turning the drum to wind on the rope, a brake automatically preventing the unwinding movement of the drum but permitting winding-on movement thereof, a grasping device on one of said levers to release the brake to permit unwinding movement of the drum, and a grasping device upon the other lever to control the engine throttle to impart winding-on movement to the drum.

42. In a hoisting apparatus, the combination with a bucket and a pair of bucket operating levers, a traversing rope and traversing drum, a grasping device on one lever to cause movement of the drum in one direction and a grasping device on the other lever to cause movement of the drum in the opposite direction.

43. In a hoisting apparatus, the combination with a bucket of a pair of bucket controlling levers, a traversed bucket support, a control element on one lever to move said support in one direction and a control element on the other lever to move the support in the opposite direction.

44. In a hoisting apparatus, the combination with a bucket of a pair of bucket operating levers, a traversing rope and rope winding drum, a brake automatically preventing the unwinding movement of the drum but normally also permitting winding on movement thereof, and means within the control of the operator controlling said bucket levers for releasing the brake to permit the unwinding movement of the drum.

45. The combination with a bucket, of a pair of bucket ropes, rope winding drums and friction devices, a pair of friction operating levers, a traversing rope and traversing drum, a pressure fluid engine to turn the drum, a throttle, a brake for the traversing rope normally applied, a pressure-actuated device for releasing the brake, a valve controlling said pressure-actuated device, and controlling elements for controlling the throttle and valve including a grasping device on one friction lever to open the throttle and a grasping device on the other friction lever to release the brake.

46. The combination with a bucket of a pair of bucket ropes, winding drums and friction devices, a pair of friction levers, a traversing rope, a pressure fluid engine, a throttle, a brake for the traversing rope, a pivoted hand grip on one friction lever for controlling the brake and a pivoted hand lever on the other friction lever for controlling the throttle.

47. The combination with a bucket of a pair of bucket ropes, winding drums and friction devices, a pair of friction levers, a traversing rope and rope winding drum, a motor for turning said drum, a device for starting the motor, a brake for the drum normally applied, means for releasing the brake including a pressure-actuated device and a valve for said pressure-actuated device, and means for controlling said starting device and valve including a grasping device on one of the friction levers.

48. The combination with a bucket of a pair of bucket operating ropes, rope winding drums and friction devices, a pair of friction levers, a traversing rope and rope winding drum, a pressure fluid engine, a throttle for said engine, a brake for holding the drum and controlling elements for the brake and throttle adapted to be controlled by the operator while maintaining his control over the friction levers and including a throttle controlling element connected to one of said levers.

49. The combination with a bucket of a pair of bucket operating levers, a traversing rope, a rope winding drum, and a pressure fluid engine to turn the same; and means at the bucket operator's position, including two movable control elements only, for controlling both the in and out movements of the traversing rope.

50. In a hoisting apparatus, the combination with a bucket of a pair of bucket operating ropes, winding drums for the same, a friction device for controlling each drum, a hand lever directly connected to mechanically control each friction, a trolley for traversing the bucket, a trolley rope, a rope winding drum, a pressure-fluid engine for turning said drum, an engine control element and a grasping device on one of said levers for controlling said engine control element.

51. In a hoisting apparatus, the combination with a bucket of a traversing support, a bucket operating rope for controlling the movement of the bucket on its support, a manually operable controlling member for said rope, traversing means for the bucket including a prime mover and a source of energy supply therefor, a control element for the prime mover and means within the grasp of the operator while holding the said bucket controlling member for controlling said prime mover control element.

52. In a hoisting apparatus, the combination with a bucket of a bucket operating rope, a manually operable controlling member for said rope, traversing means for the bucket, controlling elements for said traversing means, a pressure fluid device for operating simultaneously a plurality of said control elements, and means within the control of the operator's hand while holding the said bucket controlling lever for controlling said pressure fluid device.

53. In a hoisting apparatus, the combination with a bucket of a pair of bucket ropes, rope winding drums and friction devices, a pair of friction operating levers, a traversing rope, a rope winding drum, a fluid pressure driving engine for said drum, controlling devices for said traversing rope including a throttle and a brake and grasping means on one of the friction operating levers for controlling simultaneouly a plurality of traversing rope controlling devices.

54. In a hoisting apparatus, the combination with a bucket of a manually operable bucket operating member having a grasping portion, traversing means for the bucket, controlling devices for the traversing means, and independent grasping means on and adajacent said grasping portion of the bucket operating member for simultaneously controlling a plurality of said traverse controlling devices.

55. In a hoisting apparatus, the combination with a bucket of a pair of bucket ropes, rope winding drums and friction devices, a pair of friction operating levers, a traversing rope, rope winding drum and fluid pressure engine, controlling devices for said traversing rope including a throttle and a brake, and a device at the bucket operator's position for controlling simultaneously a plurality of said traverse controlling devices.

56. In a hoisting apparatus, the combination with a bucket, of a bucket operating lever, means including a pressure fluid engine for causing a traversing movement of the bucket, and a plurality of controlling devices for said traversing means including an engine-control element, and a single controlling member for a plurality of said controlling devices mounted on the bucket lever at the operator's position.

57. In a hoisting apparatus, the combination with a bucket, of a pair of bucket ropes, rope winding drums and friction devices, a pair of friction operating levers, a traversing rope, rope winding drum and pressure fluid driving engine, controlling devices for said traversing rope including a throttle and brake, and means for controlling said controlling devices including a grasping device on each lever.

58. In a hoisting apparatus, the combination with a bucket of a pair of bucket ropes, rope winding drums and friction devices, a pair of friction operating levers, a traversing rope, a rope winding drum, a pressure fluid driving engine, controlling devices for the traversing rope including a throttle and a brake, a pressure fluid actuating device for moving the brake, a grasping device upon one bucket lever for controlling said pressure fluid device and a grasping device upon the other bucket lever for controlling the pressure fluid driving engine.

59. In a hoisting apparatus, the combination with a bucket of a pair of bucket ropes, rope winding drums, a pair of manually operable bucket controlling members, a traversing motor, controlling devices for the traversing motor including a motor control element and a drum control element, a grasping device upon one bucket controlling member for controlling the motor control element, and a grasping device upon the other bucket controlling member for controlling the drum control element.

60. The combination with a bucket or the like of a pair of bucket operating members having grasping portions, traversing means for the bucket, controlling elements for the traversing means including a controlling device carried by and capable of independent movement with respect to the grasping portion of each operating member, the device and lever in each case having a working movement independent of the working movement of the other.

61. The combination with a bucket of a pair of bucket operating members having grasping portions, traversing means for the bucket and controlling elements for the traversing means including a pivoted hand grip mounted upon each bucket operating member and adapted to be moved by the operative while holding the bucket operating member independently of the movement of the bucket operating member.

62. In a hoisting apparatus, the combination with a bucket of manually operable controlling members for controlling the raising and lowering of the bucket and the opening and closing of its jaws, a prime mover for traversing the bucket, a source of energy supply, and means including an elastic independently operable device actuated by the hand of the operator while holding a bucket controlling member for controlling the prime mover.

63. In a hoisting apparatus, the combination with a bucket of manually-operated bucket-controlling members, a pressure-fluid traversing motor for the bucket, a pressure-fluid control element, and means mounted on one of the controlling members for controlling said control element.

64. In a hoisting apparatus, the combination with a bucket of manually-operated bucket-controlling members, a trolley rope and rope winding drum, a pressure-fluid engine for turning the drum, traverse control elements including a brake for the drum, a pressure-fluid device for moving the brake, a valve for controlling said pressure-fluid device, and means at the bucket operator's position for controlling said traversing controlling elements including a pivoted hand grip on one of the bucket controlling members for moving the valve.

65. The combination with a bucket of a pair of manually operable bucket controlling members, a traversing motor, a traverse brake and control elements for said motor and brake including a grasping device on each bucket control member.

66. The combination with a bucket of a pair of manually operable bucket controlling members, a traversing support for the bucket, a traversing motor and means at the bucket operator's position including two movable control elements only for controlling the movements of the traverse support, said elements being mounted one on each of said bucket controlling members.

67. The combination with a bucket of a traversing support, a pair of manually operable bucket controlling members for controlling movements of the bucket on its traversing support, traversing means including a prime mover and controlling devices for said prime mover including a prime mover controlling element and a grasping device on one of said bucket controlling members.

68. In a hoisting apparatus, the combination with a bucket of a traversing support, a pair of manually operable bucket controlling members provided with grasping portions, an independent grasping device on one member adjacent its grasping portion to cause movement of the support in one direction, and an independent grasping device on the other member adjacent its grasping portion to cause movement of the support in the opposite direction.

69. In a hoisting apparatus, the combination with a bucket of a traversed support, a pair of manually operable bucket controlling members for controlling movements of the bucket on its traversed support, a prime mover, a prime mover control element, a clutch between the support and the prime mover, means on one member for controlling the prime mover control element and means on the other member for controlling the clutch.

70. In a hoisting apparatus, the combination with a bucket of a pair of bucket controlling levers, a traversing support, controla pair of bucket operating ropes and rope winding drums, a pair of bucket friction levers, a traversing motor and traverse controlling elements for the support including a motor controlling device and a grasping device for actuating the same, said grasping device being connected to one of said bucket friction levers and adapted to be actuated by the operator while maintaining his hold upon said lever.

82. In a hoisting apparatus, the combination with a grab, of a rope winding drum therefor, a driving engine for said drum, an engine throttle, a controlling lever for said grab, and a hand latch on said lever for controlling said throttle.

83. In a hoisting apparatus, the combination with a bucket of a traversing support, a bucket friction lever, traversing means including a pressure fluid engine, a throttle for the engine, controlling means for the throttle, comprising a hand grip on the lever and connections between the hand grip and the throttle including a bell-crank lever on the bucket friction lever, and a member actuated by the same in substantial alinement with the axis of the friction lever.

84. In an apparatus for effecting the co-operating movements of a hoisting bucket and its traversing support, the combination with a bucket, a traversing rope, a rope winding drum, a pressure fluid engine therefor, a pair of bucket frictions, controlling levers for said frictions directly connected thereto, and auxiliary controlling devices including a pivoted hand grip upon each lever.

85. In an apparatus for effecting the co-operating movements of a hoisting bucket and its traversing support, the combination with a bucket of a traversing rope, a rope winding drum, a prime mover for the rope winding drum, a pair of bucket frictions, operating levers directly and mechanically connected thereto, and auxiliary controlling devices including a device mounted upon each of the levers, said devices and said levers in each case being provided with distinct relatively movable grasping portions each having a working movement independent of the working movement of the other.

86. In an apparatus for effecting the co-operating movement of a hoisting bucket and its traversing support, the combination with a bucket of a traversing rope, a rope winding drum and brake therefor, a fluid pressure engine for driving said drum, a pair of bucket frictions, friction controlling levers directly connected to control said frictions, and auxiliary controlling devices including a pivoted hand grip upon one lever for controlling the traverse drum brake, and a second pivoted hand grip also upon the other lever.

87. In an apparatus for effecting the co-operating movement of a hoisting bucket and its traversing support, the combination with a bucket, a traversing rope and rope winding drum, a pressure fluid engine for driving said drum, an engine throttle, a pair of bucket frictions, friction operating levers, and auxiliary controlling devices including a grasping device upon one lever for controlling the trolley engine throttle, and a grasping control device also on the other lever.

88. In an apparatus for effecting the co-operating movements of a hoisting bucket and its traversing support, the combination with a bucket of a traversing rope and rope winding drum, a prime mover for turning said drum, a pair of bucket frictions, a pair of friction operating levers, controlling elements for the traversing movement including a trolley drum brake, and auxiliary controlling devices including a grasping device upon one friction lever for controlling both the trolley drum brake and a second traversing control element, and a grasping control device also on the other friction lever.

89. In an apparatus for effecting the co-operating movement of a hoisting bucket and its traversing support, the combination with a bucket, a pair of bucket ropes, rope winding drums and bucket frictions, a pressure fluid engine for turning said drums, a pair of friction levers directly connected to said frictions for the control thereof, said levers being mounted side by side to provide an operator's stand between the same, a traversing rope and rope winding drum, a pressure fluid engine for said drum, a brake also for controlling said drum, and auxiliary controlling devices at the operator's stand including a pivoted hand grip upon one of said friction levers for controlling the brake and a hand grip also upon said remaining lever.

90. In an apparatus of the class described, the combination with a bucket, a traversing rope and rope winding drum, a pair of bucket controlling levers and auxiliary controlling means at the operator's stand including a device mounted upon each of the bucket operating levers, said device and said lever in each case being provided with distinct relatively movable grasping portions each having a working movement independent of the working movement of the other.

91. In a hoisting apparatus, the combination with a bucket, a traversing support, a hoisting rope, an opening and closing rope, a rope winding drum for each rope, a friction device for each drum, a pair of bucket controlling hand levers to control each a friction device, and auxiliary controlling elements for the bucket including an auxiliary controlling device mounted upon each one of the bucket levers and within the grasp of the hand holding the bucket lever, said auxiliary device and bucket lever havling means for the traversed support including a member axially alined with the bucket operating levers, and a grasping device upon each lever.

71. In a hoisting apparatus, the combination with a bucket of a traversing support, a manually operable bucket controlling member for controlling movements of said bucket on said support, a prime mover for traversing the same, a source of energy supply for said prime mover, a starting device for controlling the energy supply for the prime mover, and a manually actuated controlling element for the starting device adapted to be actuated by the operator while holding said member.

72. In a hoisting apparatus, the combination with a bucket of a traversing support, a manually operable bucket controlling member for controlling movements of the bucket on its traversed support, a prime mover for traversing the support, a source of energy supply for said prime mover, a starting device for controlling the energy supply therefor, and a controlling element for the starting device mounted upon said member, said member and controlling element having each a working movement independent of the working movement of the other.

73. The combination with a bucket of a pair of manually operable bucket controlling elements, a traversing support, traversing means including a prime mover and a source of power, means for controlling the transverse including a power control element for the prime mover on one of the said bucket control members, and a second transverse control element on the other bucket control member.

74. In a hoisting apparatus, the combination with a bucket of a manually operable bucket controlling member, traversing means for the bucket, controlling devices for said traversing means including a brake, a pressure-actuated device for simultaneously actuating said brake and a second traversing control device, a valve for said pressure-actuated device and means adapted to be controlled by the operator while holding said bucket controlling member for moving said valve.

75. In a hoisting apparatus, the combination with a bucket of a traversing support, a manually operable bucket controlling member for controlling the movements of the bucket on said support, traversing means for said support, controlling devices for the traversing means, and means controlled by the hand of the operator while holding a bucket controlling member for simultaneously controlling a plurality of said traverse controlling devices.

76. In a hoisting apparatus, the combination with a bucket of a traversing support, a manually operable bucket controlling member for controlling the movements of the bucket on said support, traversing means therefor including a prime mover, controlling devices for said traversing means including a throttle and a brake, and a device at the bucket operator's position and adapted to be moved by the hand of the operator while holding a bucket controlling member for simultaneously controlling said brake and a second traverse controlling device.

77. The combination with a bucket of a traversing support, a pair of manually operable bucket controlling members for controlling the movements of the bucket on said support, a traversing motor, and means at the bucket operator's position including tw[o] [oper]able control elements only for controlling [m]ovements of the traversed support, [o]ne of said elements being controlled by the hand of the operator while holding a bucket controlling member.

78. In a hoisting apparatus, the combination with a bucket of a traversing support, a pair of manually operable bucket controlling members for controlling the movements of the bucket on its traversed support, a controlling element adapted to be moved by the hand of the operator while holding a bucket controlling member to cause movement of the support in one direction, and a controlling element also within the control of the bucket operator for causing movement of the support in the opposite direction.

79. In a hoisting apparatus, the combination with a bucket of a traversing support, controlling members for controlling the movement of the bucket on its traversing support, a brake permitting free movement of the support in one direction only while holding the same against movement in the opposite direction, a prime mover for moving the support and traverse controlling devices at the bucket operator's position including a brake-releasing element and a prime mover controlling element, one of said elements being adapted to be controlled by the bucket operator while controlling said bucket controlling members.

80. In a hoisting apparatus, the combination with a bucket of a traversing support therefor, a pair of controlling levers for controlling the movement of the bucket on its traversed support, traversing means, a traverse controlling hand grip upon one of said levers, a slide rod axially alined therewith, means connecting said slide rod with said hand grip, controlling means for said traversing means connected with said slide rod and controlled through movement of said hand grip, and a second traversing controlling hand grip upon said remaining controlling lever.

81. In a hoisting apparatus, the combination with a bucket of a traversing support, ing each a working movement independent of the working movement of the other.

92. In a hoisting apparatus, the combination with a hoisting bucket, a pair of bucket frictions and friction controlling levers, a traversing rope and rope winding drum, a prime mover for turning said drum, a source of energy supply for said prime mover, a starting device for controlling the energy supply for said prime mover and a pivoted hand grip for said starting device mounted upon one of said controlling levers.

93. In a hoisting apparatus, the combination with a bucket of a pair of bucket operating ropes, winding drums for the same, a friction device for controlling each drum, a hand lever directly connected to mechanically control each friction, a trolley for traversing the bucket, a trolley rope, a rope winding drum, a pressure-fluid engine for turning said drum, an engine control element and a pivoted hand grip on one of said levers for controlling said engine control element.

94. In a hoisting apparatus, the combination with a bucket of a manually operable bucket operating member having a grasping portion, traversing means for the bucket, controlling devices for the traversing means, and a pivoted hand-grip on and adjacent said grasping portion of the bucket operating member for simultaneously controlling a plurality of said traverse controlling devices.

95. In a hoisting apparatus, the combination with a bucket of a traversing support, a bucket friction lever, traversing means for said support, controlling devices for said traversing means, and a pivoted hand grip on the friction lever for simultaneously controlling a plurality of said traverse control devices.

96. In a hoisting apparatus, the combination with a bucket of a traversing support, a bucket friction lever, the traversing means including a prime mover, controlling devices for said traversing means including a throttle and a brake, and a pivoted hand grip on the friction lever for simultaneously controlling the brake and a second traverse control device.

In testimony whereof, I have signed my name to this specification, in the presence of two subscribing witnesses.

ALMON E. NORRIS.

Witnesses:
JOSEPH SARGENT, Jr.,
THOMAS B. BOOTH.

Copies of this patent may be obtained for five cents each, by addressing the "Commissioner of Patents, Washington, D. C."

DISCLAIMER.

1,071,010.—*Almon E. Norris*, Cambridge, Mass. HOISTING APPARATUS. Patent dated August 19, 1913. Disclaimer filed November 18, 1915, by the assignee, *Mead Morrison Manufacturing Company*.

Enters its disclaimer—

"To claims numbered 27, 57, and 63 in said specification, which are in the following words, to wit:

"27. In a hoisting apparatus, the combination with a bucket or the like of a traversing rope, a traversing drum, bucket ropes, a pair of winding drums for the said bucket ropes, a friction device for each drum, a pair of bucket controlling levers directly and mechanically connected to control each a friction device, a pressure fluid engine for driving the traversing drum, a starting device for said engine, a brake for said drum, controlling elements for the traversing drum adapted to be actuated by the operator while controlling said bucket friction levers and including an auxiliary control element for the said brake and a second control element for the said starting device.

"57. In a hoisting apparatus, the combination with a bucket, of a pair of bucket ropes, rope winding drums and friction devices, a pair of friction operating levers, a traversing rope, rope winding drum and pressure fluid driving engine, controlling devices for said traversing rope including a throttle and brake, and means for controlling said controlling devices including a grasping device on each lever.

"63. In a hoisting apparatus, the combination with a bucket of manually-operated bucket-controlling members, a pressure-fluid traversing motor for the bucket, a pressure-fluid control element, and means mounted on one of the controlling members for controlling said control element."

[*Official Gazette, December 14, 1915.*]

ing each a working movement independent of the working movement of the other.

92. In a hoisting apparatus, the combination with a hoisting bucket, a pair of bucket frictions and friction controlling levers, a traversing rope and rope winding drum, a prime mover for turning said drum, a source of energy supply for said prime mover, a starting device for controlling the energy supply for said prime mover and a pivoted hand grip for said starting device mounted upon one of said controlling levers.

93. In a hoisting apparatus, the combination with a bucket of a pair of bucket operating ropes, winding drums for the same, a friction device for controlling each drum, a hand lever directly connected to mechanically control each friction, a trolley for traversing the bucket, a trolley rope, a rope winding drum, a pressure-fluid engine for turning said drum, an engine control element and a pivoted hand grip on one of said levers for controlling said engine control element.

94. In a hoisting apparatus, the combination with a bucket of a manually operable bucket operating member having a grasping portion, traversing means for the bucket, controlling devices for the traversing means, and a pivoted hand-grip on and adjacent said grasping portion of the bucket operating member for simultaneously controlling a plurality of said traverse controlling devices.

95. In a hoisting apparatus, the combination with a bucket of a traversing support, a bucket friction lever, traversing means for said support, controlling devices for said traversing means, and a pivoted hand grip on the friction lever for simultaneously controlling a plurality of said traverse control devices.

96. In a hoisting apparatus, the combination with a bucket of a traversing support, a bucket friction lever, the traversing means including a prime mover, controlling devices for said traversing means including a throttle and a brake, and a pivoted hand grip on the friction lever for simultaneously controlling the brake and a second traverse control device.

In testimony whereof, I have signed my name to this specification, in the presence of two subscribing witnesses.

ALMON E. NORRIS.

Witnesses:
JOSEPH SARGENT, Jr.,
THOMAS B. BOOTH.

Copies of this patent may be obtained for five cents each, by addressing the "Commissioner of Patents, Washington, D. C."

DISCLAIMER.

Disclaimer in Letters Patent No. 1,071,010.

1,071,010.—*Almon E. Norris*, Cambridge, Mass. HOISTING APPARATUS. Patent dated August 19, 1913. Disclaimer filed November 18, 1915, by the assignee, *Mead Morrison Manufacturing Company.*

Enters its disclaimer—

"To claims numbered 27, 57, and 63 in said specification, which are in the following words, to wit:

"27. In a hoisting apparatus, the combination with a bucket or the like of a traversing rope, a traversing drum, bucket ropes, a pair of winding drums for the said bucket ropes, a friction device for each drum, a pair of bucket controlling levers directly and mechanically connected to control each a friction device, a pressure fluid engine for driving the traversing drum, a starting device for said engine, a brake for said drum, controlling elements for the traversing drum adapted to be actuated by the operator while controlling said bucket friction levers and including an auxiliary control element for the said brake and a second control element for the said starting device.

"57. In a hoisting apparatus, the combination with a bucket, of a pair of bucket ropes, rope winding drums and friction devices, a pair of friction operating levers, a traversing rope, rope winding drum and pressure fluid driving engine, controlling devices for said traversing rope including a throttle and brake, and means for controlling said controlling devices including a grasping device on each lever.

"63. In a hoisting apparatus, the combination with a bucket of manually-operated bucket-controlling members, a pressure-fluid traversing motor for the bucket, a pressure-fluid control element, and means mounted on one of the controlling members for controlling said control element."

[*Official Gazette, December 14, 1915.*]

DISCLAIMER.

1,071,010.—*Almon E. Norris*, Cambridge, Mass. HOISTING APPARATUS. Patent dated August 19, 1913. Disclaimer filed November 18, 1915, by the assignee, *Mead Morrison Manufacturing Company*.

Enters its disclaimer—

"To claims numbered 27, 57, and 63 in said specification, which are in the following words, to wit:

"27. In a hoisting apparatus, the combination with a bucket or the like of a traversing rope, a traversing drum, bucket ropes, a pair of winding drums for the said bucket ropes, a friction device for each drum, a pair of bucket controlling levers directly and mechanically connected to control each a friction device, a pressure fluid engine for driving the traversing drum, a starting device for said engine, a brake for said drum, controlling elements for the traversing drum adapted to be actuated by the operator while controlling said bucket friction levers and including an auxiliary control element for the said brake and a second control element for the said starting device.

"57. In a hoisting apparatus, the combination with a bucket, of a pair of bucket ropes, rope winding drums and friction devices, a pair of friction operating levers, a traversing rope, rope winding drum and pressure fluid driving engine, controlling devices for said traversing rope including a throttle and brake, and means for controlling said controlling devices including a grasping device on each lever.

"63. In a hoisting apparatus, the combination with a bucket of manually-operated bucket-controlling members, a pressure-fluid traversing motor for the bucket, a pressure-fluid control element, and means mounted on one of the controlling members for controlling said control element."

[*Official Gazette, December 14, 1915.*]